United States Patent Office 3,301,357
Patented Jan. 31, 1967

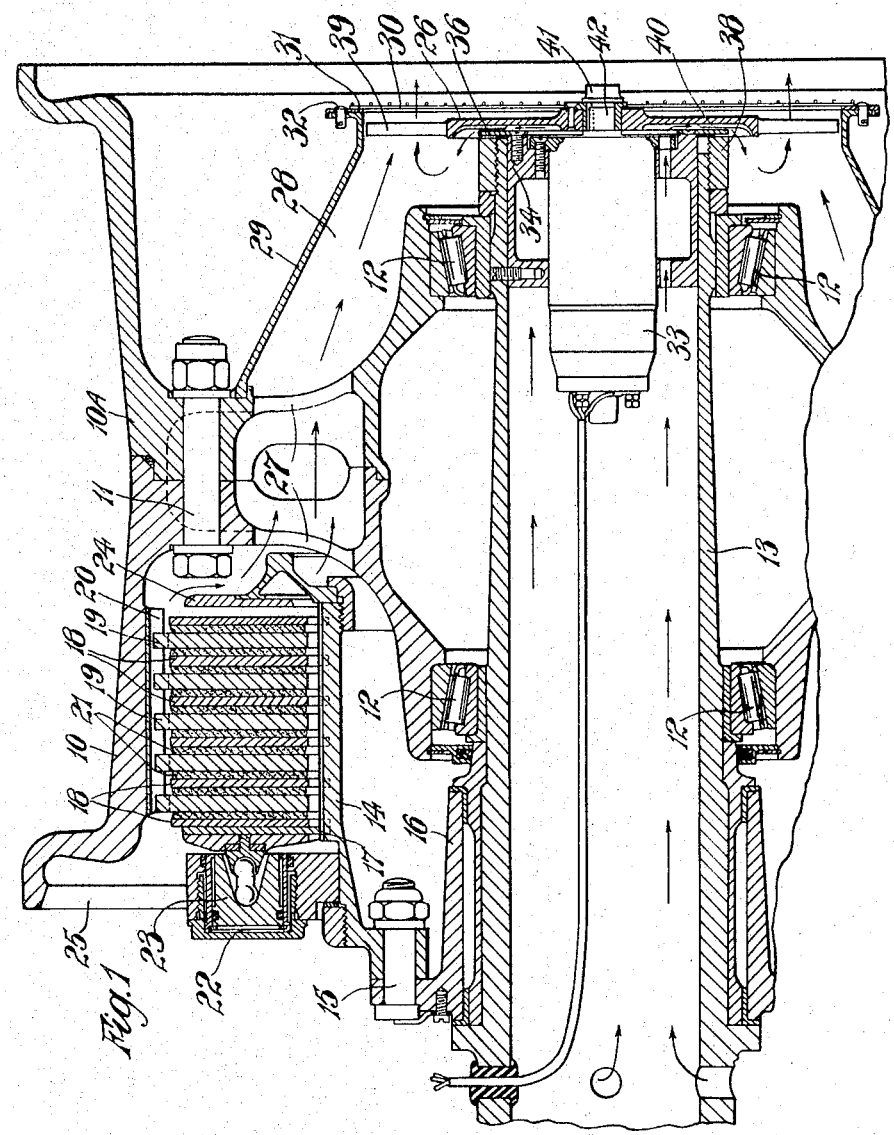

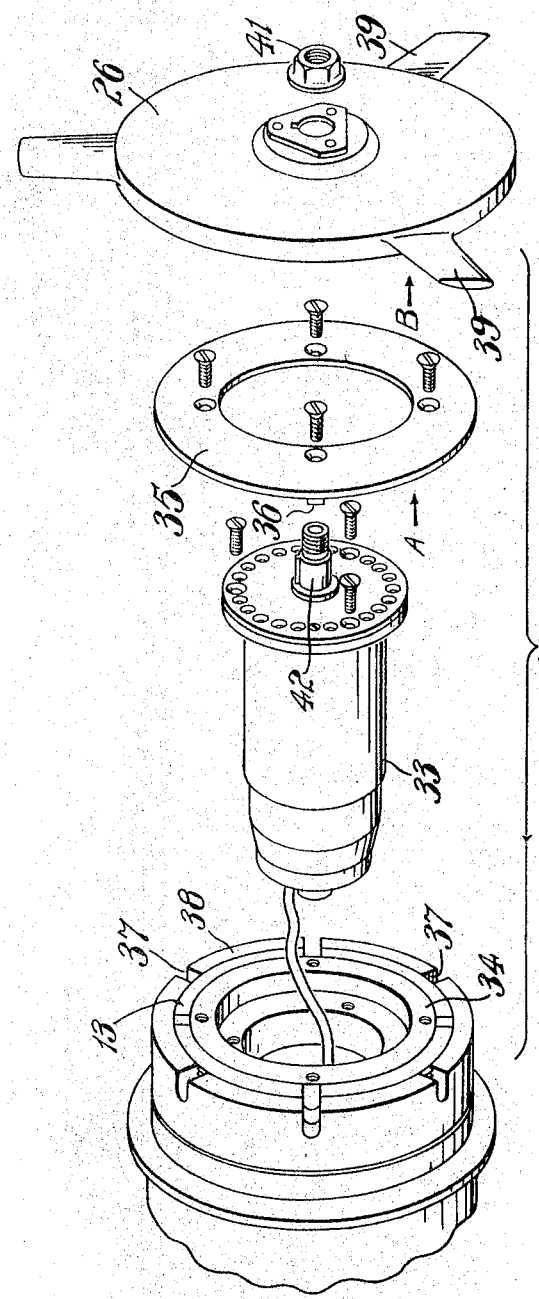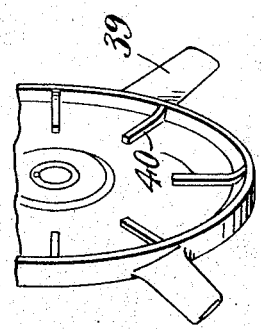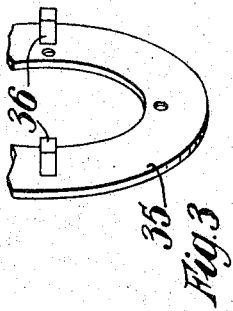

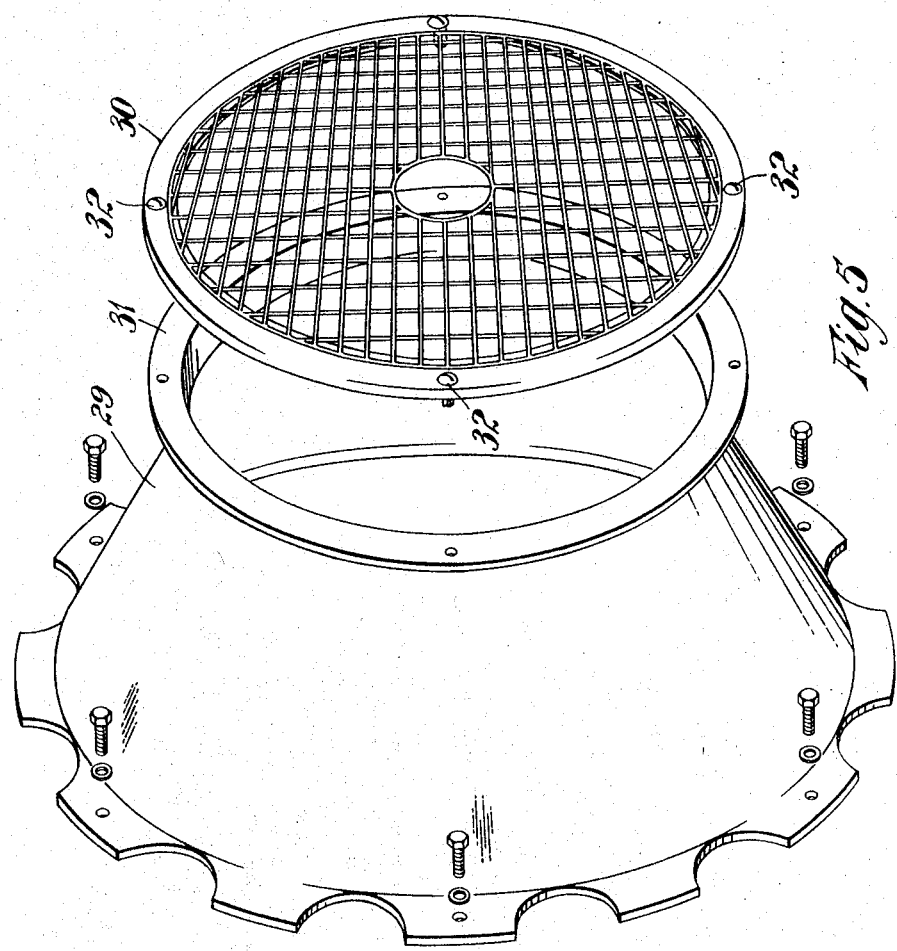

3,301,357
COOLING MEANS FOR WHEEL AND
BRAKE ASSEMBLY
Richard Cleminson Cussons, Cirencester, and Douglas Dewar, Wolston, near Coventry, England, assignors to Dunlop Rubber Company Limited, London, England, a British company
Continuation of application Ser. No. 39,664, June 29, 1960. This application Apr. 25, 1966, Ser. No. 545,165
Claims priority, application Great Britain, July 2, 1959, 22,681/59
10 Claims. (Cl. 188—264)

This application is a continuation of application 39,664 filed on June 29, 1960, now abandoned.

As an aircraft lands and the brakes are applied, kinetic energy is converted into heat in the brake assembly. Present-day aircraft are of great weight and have high landing speeds so that this heat build-up is very considerable and unless checked can cause distortion of the wheel and brake discs, damage to the tires and can unduly delay the turn-round time of the aircraft.

The invention provides an aircraft landing gear comprising a wheel rim rotatably mounted on a non-rotatable axle, a disc brake assembly disposed between the wheel rim and the axle, a fan arranged to pass a current of cooling air through the disc brake assembly and a driving motor for the fan.

The stream of air induced by the fan extracts heat from the brake thereby substantially increasing the cooling rate of the brake. This stream of air, part of which passes between the brake and the wheel rim, also effectively reduces the amount of heat which is absorbed by the wheel rim from the brake, thus preventing over-heating of the tire bead with its conseqent danger of tire failure by bursting.

One embodiment of the invention will now be described in more detail, by way of example, with reference to the accompanying drawings, in which:

FIGURE 1 is a vertical section through the brake,
FIGURE 2 is an exploded view showing the motor, the impeller and certain associated components,
FIGURE 3 is a view looking in the direction of the arrow A in FIGURE 2,
FIGURE 4 is a view looking in the direction of the arrow B in FIGURE 2, and
FIGURE 5 is an exploded view showing certain other components.

Like reference numerals indicate like parts throughout the figures.

The brake shown in FIGURE 1 includes a wheel rim formed of two parts 10, 10A secured together by bolts 11 and rotatably supported on bearings 12 on a fixed hollow axle 13 secured to an oleo leg (not shown). An annular torque member 14 is secured by bolts 15 to a sleeve 16 fixed to the axle 13 and is formed with splines 17 on which are slidably mounted stator brake discs 18. Corresponding rotor brake discs 19 are mounted to slide on splines 20 on the wheel rim and are interleaved with the stator discs 18, layers 21 of friction material being interposed between the discs 18, 19. A number of brake cylinders 22 are disposed in a circle, around the axle 13 and each contains a piston 23. On admission of fluid under pressure to the cylinders 22, the assembly of brake discs 18, 19 with the intervening layers 21 of friction material are forced into frictional engagement against an annular backing plate 24.

The brake is cooled by drawing air, by means of an impeller 26, through apertures 25 in the wheel rim, through the engaged brake assembly and through holes 27 in the wheel rim and a duct 28 enclosed by a annular shield 29 fixed to the wheel rim. The air emerges through a grating 30, mounted on a ring 31 fixed by fasteners 32 to the end of the shield 29.

The impeller 26 is driven by an electric motor 33 located within the hollow axle 13. The motor housing 34 is attached to a locking plate 35, having projections 36 (FIGURES 2 and 3) which engage slots 37 in an axle nut 38, which holds the wheel rim on the axle, so preventing said nut from turning.

The impeller 26 has projecting fan blades 39, which induce air to flow over the brake discs as described above, and also internal vanes 40 which cause a current of air to flow through the hollow axle 13 for the purpose of cooling the motor 33. The impeller 26 is secured by a nut 41 on the end of the drive shaft 42 of the motor 33.

The motor 33 may be energized to drive the impeller 26 either automatically, on compression of the oleo leg, or manually by the crew or alternatively it can be energized when the temperature of the brake has reached a predetermined value. Rotation of the blades 39 draws air over the brake and dispels it from the duct 28 and the air stream thus obtained materially assists cooling of the wheel and brake (particularly after the brakes have been applied and the aircraft is stationary). The vanes 40 at the same time draw cooling air past the motor 33 so that the motor also is prevented from overheating.

We claim:

1. An aircraft landing gear which comprises a non-rotatable hollow axle, a wheel rim rotatably supported on said axle and spaced concentrically from the axle to form an open ended axially extending annular passage, a disc brake mounted in said passage and connected to said axle and said rim to provide passages for air axially of said passage, a motor in said axle operable independently of said wheel and a fan driven by said motor and having blades extending radially across said annular passage to pass an axially directed flow of cooling air through said passage and about said brake assembly.

2. The aircraft landing gear of claim 1 in which said disc brake comprises a series of annular plates encircling said axle, alternate plates being slidably mounted on said rim and on said axle, respectively, and friction elements between said discs, and force applying means mounted on said axle to move said plates and friction elements into contact under pressure.

3. The aircraft landing gear of claim 2 in which said force applying means comprises a series of cylinders and pistons spaced circumferentially about said axle.

4. The aircraft landing gear of claim 2 in which said force applying means is mounted at one end of said series of plates and said fan is a suction fan mounted at the other end of said series of plates to draw air past said force applying means and said discs.

5. The aircraft landing gear of claim 1 having a second fan driven by said motor to pass air through said axle and about said motor.

6. The aircraft landing gear of claim 1 in which said fan comprises blades extending radially outward from the shaft of said motor and said passage comprises a shield converging from said rim to the outer ends of said blades.

7. An aircraft landing gear comprising a non-rotatable axle, a wheel rim concentric with and rotatably supported on said axle and of a diameter to form an axially extending annular passage encircling said axle and having openings at its ends, a disc brake mounted in said passage and comprising a series of annular discs encircling said axle and entirely within said open-ended passage and between the openings at the opposite ends of said passage, alternate discs of said series being secured to said axle and said rim respectively to slide in an axial direction thereon, means to force said discs into frictional contact to apply the brake, and electrically driven means supported by said axle at one end of said axially extending annular passage to move a current of air through said passage in contact with said series of annular discs and through both ends of said annular passage.

8. The aircraft landing gear of claim 7 in which said means to move said current of air is an electric motor supported by said axle and a fan mounted on and driven by said motor.

9. An aircraft landing gear comprising a non-rotatable axle having an annular torque member, a wheel rim concentric with and rotatably supported on said axle and of a diameter to form an axially extending annular passage encircling said annular torque member and having openings at its opposite ends, a disc brake mounted in said passage and comprising a series of annular discs encircling said axle and entirely within said open-ended passage and between the openings at the opposite ends of said passage, alternate discs of said series being secured to said annular torque member and said rim respectively to slide in an axial direction thereon, means to force said discs into frictional contact to apply the brake, and electrically driven means supported by said axle at one end of said axially extending annular passage to move a current of air through said passage from the opening at one end thereof, thence axially through said passage in contact with said discs and out of said passage through the opening at the other end of said passage.

10. The aircraft landing gear of claim 9 in which said means to move said current of air is an electric motor supported by said axle and a fan mounted on and driven by said motor.

References Cited by the Examiner
UNITED STATES PATENTS

| | | | |
|---|---|---|---|
| 2,922,495 | 1/1960 | Griswold | 188—264 |
| 2,959,255 | 11/1960 | White | 188—264 |

MILTON BUCHLER, *Primary Examiner.*

G. E. A. HALVOSA, *Assistant Examiner.*